No. 840,395. PATENTED JAN. 1, 1907.
N. B. STONE.
FASTENING MEANS.
APPLICATION FILED MAY 7, 1906.
2 SHEETS—SHEET 2.
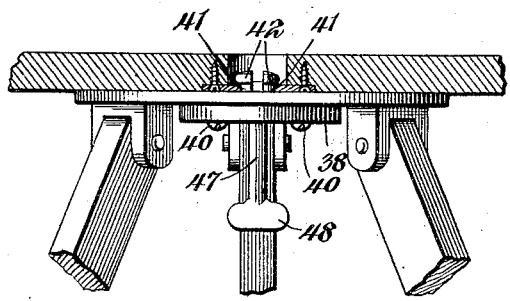
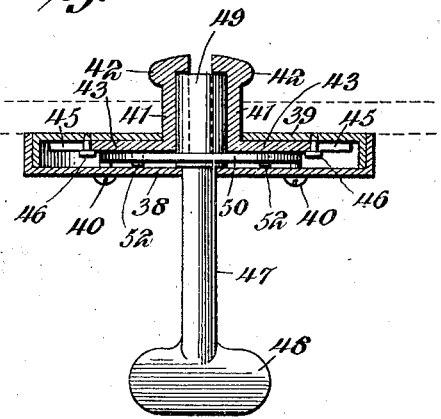
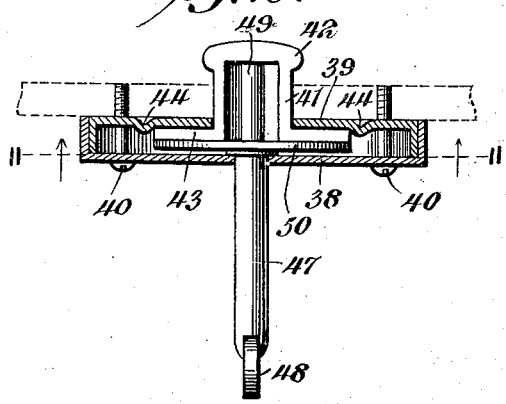
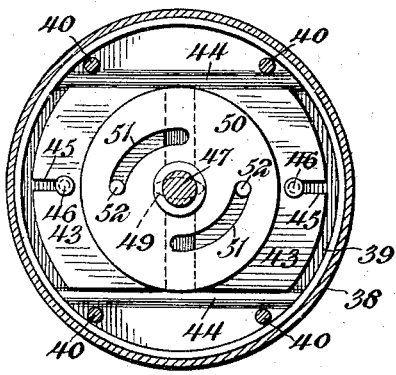
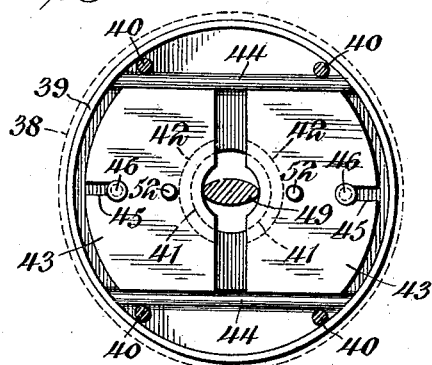
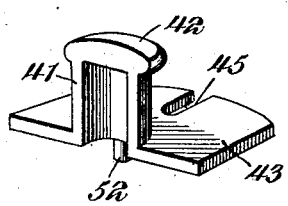
Nathaniel B. Stone, Inventor,
Witnesses

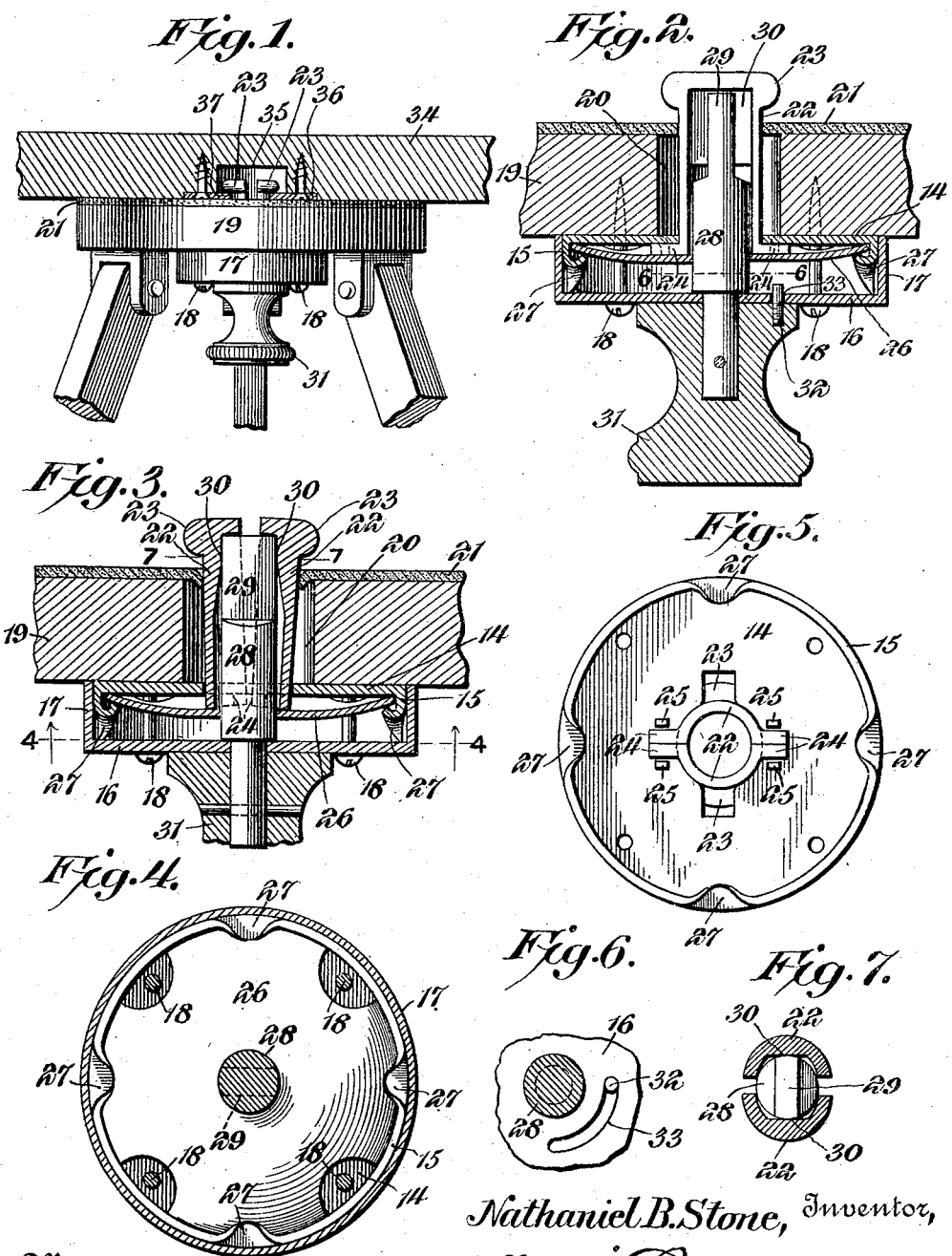

UNITED STATES PATENT OFFICE.

NATHANIEL B. STONE, OF OUTLOOK, WASHINGTON, ASSIGNOR OF ONE-HALF TO GEORGE SHILLING, OF WASHINGTON, DISTRICT OF COLUMBIA.

FASTENING MEANS.

No. 840,395.

Specification of Letters Patent.

Patented Jan. 1, 1907.

Application filed May 7, 1906. Serial No. 315,630.

*To all whom it may concern:*

Be it known that I, NATHANIEL B. STONE, a citizen of the United States, residing at Outlook, in the county of Yakima and State of Washington, have invented a new and useful Fastening Means, of which the following is a specification.

This invention relates to means for fastening two articles together, and while particularly intended for detachably securing a camera or other instrument to a tripod or like support it is not necessarily limited to this use, but is capable of being successfully employed for a variety of analogous purposes.

The principal object is to provide a novel, simple, and inexpensive device whereby one article, such as a camera, can be quickly and effectively secured to another—as, for instance, the tripod—being as readily detachable therefrom, said device permitting the relative rotation of the parts, if desired, without affecting the secure holding relation between them.

Two embodiments of the invention are herein disclosed, and an inspection of the claims appended will indicate that the said invention is not limited to these two forms of construction.

In the accompanying drawings, Figure 1 is a side elevation of the preferred embodiment of the invention, showing the same securing a camera-bed to a tripod-head. Fig. 2 is a vertical sectional view through the structure. Fig. 3 is a sectional view at right angles to Fig. 2. Fig. 4 is a horizontal sectional view on the line 4 4 of Fig. 3. Fig. 5 is a bottom plan view of the inner casing-section and associated parts with portions of the mechanism removed. Fig. 6 is a detail sectional view on the line 6 6 of Fig. 2. Fig. 7 is a similar view on the line 7 7 of Fig. 3. Fig. 8 is a side elevation of a slightly-modified form of construction. Fig. 9 is a vertical sectional view therethrough. Fig. 10 is a sectional view at right angles to Fig. 9. Fig. 11 is a horizontal sectional view on the line 11 11 of Fig. 10. Fig. 12 is a detail plan view of the inner casing-section and associated parts. Fig. 13 is a detail perspective view of one of the locking members.

Similar reference-numerals designate corresponding parts in all the figures of the drawings.

Referring to the embodiment illustrated in the first seven figures, a casing is employed comprising separable sections, the inner section having a side wall 14 and an annular flange 15, the outer section also having a side wall 16 and an annular flange 17, that overlaps the flange 15. These sections are secured together by holding devices 18, passed therethrough and constituting the means for securing the device to one of the members to be connected. Thus in the present embodiment the fasteners 18 are in the form of screws, which engage in the under side of a tripod-head 19, said tripod-head having a central opening 20 and an upper cushioned face 21.

Projecting from the upper side wall 14 of the casing is a sectional locking-bolt, comprising a tubular sectional stem having at its upper end a sectional enlarged head. These sections form separable locking members, and the head-sections carried thereby constitute, in effect, outstanding latch elements. The sections of the stem are designated 22, while the head-sections are shown at 23. The stem-sections are pivoted at their inner ends within the casing, and for this purpose said inner ends are provided with outstanding pintles 24, engaged between lugs 25, projecting inwardly from the casing-wall 14. The sectional bolt extends through the opening 20 in the tripod-head, and the head 23 of said bolt projects above the upper side of the tripod-head, as clearly shown. The head-sections 23 and stem-sections 22 are urged toward each other by a plate-spring 26, located within the casing and bearing against the inner ends of the stem-sections and against the pintles. This plate-spring may be held in position by any suitable means—as, for instance, by crimping the flange 15 at suitable intervals over the margins of the spring 26, as shown at 27. It not only constitutes means for holding the bolt-sections together, but also has a broad bearing engagement with the sections to maintain them in position and prevent side play transversely of the path of movement of the sections toward and from each other.

Means are provided for positively separating the head-sections 23, and for this purpose a shank 28 is rotatably mounted in the casing, its axis of rotation being disposed longitudinally of the sectional bolt. The inner portion of this shank is located longitudinally within the bore of the sectional stem 22, and its inner end is in the form of a cam 29, which engages bearing-surfaces 30 within the stem. These surfaces are also preferably located within the head in order that the bearing may be located as near the outer end of the separable bolt as possible. The shank 28 passes through the plate-spring 26 and through the lower wall 16 of the casing. It is provided on its projecting end with a suitable operating knob or head 31, which knob or head carries a pin 32, that operates in the slot 33 in the casing-wall 16 and serves to limit the rotatable movement of the shank and cam portion.

The instrument to be connected to the head may be of any suitable character. The bed of such instrument is shown at 34 in Fig. 1 and has a socket 35, the lower end of which is surrounded and partially closed by a plate or disk 36, having a central opening 37.

It is believed that the operation of the device can now be made plain. Under normal conditions, or when the structure is not in use, the shank 28 is turned so as to permit the spring-plate 26 to act upon the bolt-sections and hold them in closed condition. The head is then small enough to pass through the opening 37 of the retaining-plate 36 of the instrument. Consequently, to secure such instrument to the tripod it is only necessary to place it upon the tripod-head, allowing the head of the bolt to pass through the opening 37. When so positioned, a half turn of the knob 31 rotates the cam 29 and separates the head-sections 23 against the action of the spring. When so separated, said head-sections 23 are engaged over the retaining-plate 36. It will be evident that this is a quick-action device and that it constitutes an effective connection between the two parts. Moreover, the bolt-sections are not only positively separated, but are positively held in separated relation, obviating any danger of the connected parts becoming uncoupled. Furthermore, the instrument can be rotated on the tripod or placed thereupon without regard to its direction and without in any manner affecting the security of the connecting means.

While the above-described embodiment of the invention is at present believed to be the preferable form of construction, a slight modification thereof is illustrated in Figs. 8 to 13, inclusive. This latter structure is perhaps particularly useful where the tripod-head is comparatively thin—as, for instance, if made of metal—in which case difficulty might be encountered in obtaining sufficient length of bolt to secure the proper swinging movements of the sections. In this embodiment of the invention the casing also comprises sections 38 and 39, held together by screws 40, which serve to hold the device to the tripod-head. The bolt comprises a tubular stem composed of sections 41, having head-sections 42 on their outer ends. The sections of the bolt in this instance have reciprocatory instead of swinging movements, and for this purpose the inner ends of the stem-sections are carried by plates 43, slidably mounted within the casing upon the upper wall thereof. The plates 43 are disposed between guide-ribs 44 and preferably have central slots 45 in their rear ends, which slots receive headed studs 46.

The actuating means for the bolt-sections consists of a shank 47, projecting from the lower casing-wall and having an actuating-head 48 at its lower end. The upper end of the shank constitutes a cam 49 and is elliptical in cross-section, the bore of the bolt-stem being correspondingly shaped and receiving the same. A disk 50 is carried by the shank 47 and is located within the casing, said disk being provided with cam-slots 51, that receive pins or studs 52, carried by the slide-plates 43.

With this construction substantially the same action is secured as in the first-described embodiment of the invention—that is to say, if the shank 47 is rotated in one direction the bolt-sections will be separated, so that they will engage and properly hold an instrument upon the tripod. If turned in an opposite direction, the pins or studs 52, riding in the cam-slots 51, will cause the movement of the slide-plates 43 toward each other, so that the sections of the bolt will be moved together. By this means, therefore, a positive outward and a positive inward movement is effected. Moreover, it will be apparent that the connecting-bolt may be made as short as desired without in any manner affecting the distance the bolt-sections may be separated.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In a device of the character set forth, the combination with a bolt having an enlarged head, said bolt comprising separate sections movable toward and from each other, of rotatable means operating between and including a rotatable portion that engages the sections of the bolt for positively separating the same and positively locking them in separated condition.

2. In a device of the character set forth, the combination with a sectional bolt having an enlarged split head, of a device disposed longitudinally within the bolt and including a rotatable cam operating between and engaging the sections thereof to positively separate the same and maintain them in separated condition.

3. In a device of the character set forth, the combination with a sectional bolt having an enlarged split head, of a rotatable device disposed within the bolt and having a rotatable cam portion operating between and engaging the sections of the same to positively separate them and positively lock said sections in separated condition, said device having its axis of rotation disposed longitudinally of the bolt.

4. In a device of the character set forth, the combination with a sectional bolt comprising a sectional tubular stem, a sectional head carried thereby, of a rotatable device located longitudinally within the bore of the stem and engaging the sections for separating the same upon its rotation, and means for rotating said device.

5. In a device of the character set forth, the combination with a bolt comprising a tubular stem having a head at one end, said stem being divided into two separate sections, of means located longitudinally within the bore of the stem and having a rotatable device engaging the sections thereof for separating said sections of the stem and head, said means projecting from the end of the stem that is opposite to the head.

6. In a device of the character set forth, the combination with separable members having latch elements, of an actuating device for separating the members and including a rotatable cam engaging the inner sides of the latch elements, said device being disposed longitudinally between the members and projecting beyond the same at one end.

7. In a device of the character set forth, the combination with separable members having latch elements at one end, of a rotatable actuating device having a rotatable separating portion engaging the inner sides of the members for separating said members, said device being disposed longitudinally between the members and projecting beyond the opposite ends thereof to the latch elements.

8. In a device of the character set forth, the combination with a sectional bolt comprising a sectional tubular stem and a sectional head carried thereby, of a rotatable shank located longitudinally of the bolt and having a cam portion disposed in the stem and operating against the sections thereof, said shank projecting beyond one end of the stem and having an actuating-head.

9. In a device of the character set forth, the combination with a casing, of a locking device movably mounted in the casing and projecting from one side of the same, said device comprising separable sections, and means for separating the sections including an actuating device projecting from the opposite side of the casing.

10. In a device of the character set forth, the combination with a casing, of a split locking-bolt comprising a tubular sectional stem and a sectional head carried thereby, said stem projecting from one side of the casing and having its inner end movably mounted in the same, and means for separating the sections including a rotatable shank disposed longitudinally within the bore of the stem and having a rotatable portion engaging the sections, and an actuating device projecting from the opposite side of the casing to the locking device.

11. In a device of the character set forth, the combination with separable locking members, of yielding means for urging the members toward each other, and a rotatable cam engaging the members for positively separating said members and maintaining them in separated condition.

12. In a device of the character set forth, the combination with pivoted and separable locking members, of a spring bearing against the members to urge the same toward each other, and a cam device rotatably mounted between and engaging the members for positively separating the same and maintaining them in separated condition.

13. In a device of the character set forth, the combination with a casing, of a sectional bolt projecting from one side of the same and comprising separable sections pivoted at their inner ends within the casing and having a sectional head at their outer ends, of a spring located within the casing and bearing against the inner ends of the sections to swing the outer ends toward each other, a cam device located between the sections of the bolt for swinging the same, said cam device having its axis of rotation disposed longitudinally of the bolt, and an actuating device connected to the cam device and projecting from the opposite side of the casing to the bolt.

14. In a device of the character described, the combination with a casing, of a sectional bolt projecting from one side of the same, said bolt comprising a tubular sectional stem, the sections of which are pivoted within the casing at their inner ends, the outer ends of said sections having a sectional head, a plate-spring secured within the casing and bearing against the inner ends of the stem-sections to swing the outer ends toward each other, a shank rotatably mounted in the casing and projecting from the opposite side to the bolt, a cam carried by the inner end of the shank and located between the stem-sections for moving the same apart, and an actuating-head carried by the projecting end of the shank.

15. In a device of the character set forth, the combination with a casing comprising separable sections, of separable locking members projecting from and having their inner ends movably mounted in one section, and means mounted on the other section for effecting the relative movement of the members, said means including a rotatable cam detachably engaging said members.

16. In a device of the character set forth, the combination with a casing comprising separable sections, of a bolt projecting from one side of the casing and comprising separable sections mounted on one of the sections of the casing, means for separating the bolt-sections, mounted on the other casing-section and projecting from the opposite side of said casing to the bolt, and means other than said separating means for securing the casing to a support, said securing means passing through both of the casing-sections.

In testimony that I claim the foregoing as my own I have hereto affixed my signature in the presence of two witnesses.

NATHANIEL B. STONE.

Witnesses:
  JOHN H. SIGGERS,
  S. GEORGE TATE.